United States Statutory Invention Registration [19]

[11] Reg. Number: H419

Ross

[43] Published: Feb. 2, 1988

[54] CONTOURED PUNCH TOOL FOR REMOVING SEMI-TUBULAR RIVETS

[75] Inventor: Halver V. Ross, Bountiful, Utah

[73] Assignee: The United States of America as represented by the Secretary of the Air Force, Washington, D.C.

[21] Appl. No.: 913,633

[22] Filed: Sep. 30, 1986

Related U.S. Application Data

[62] Division of Ser. No. 743,326, Jun. 10, 1985, abandoned.

[51] Int. Cl.[4] ..... B23P 19/02

[52] U.S. Cl. ..... 29/426.4; 29/275; 30/358

[58] Field of Search ..... 29/275; 59/7, 11; 83/682, 686; 30/360, 361, 358, 366, 367, 368

[56] References Cited

U.S. PATENT DOCUMENTS

| | | | |
|---|---|---|---|
| 843,875 | 2/1907 | Dunham | 83/682 |
| 1,802,282 | 4/1931 | Siemer | 30/358 |
| 1,922,614 | 8/1933 | Bradshaw | 30/358 |
| 2,117,149 | 5/1938 | Clevenger | 30/358 |
| 2,409,589 | 10/1946 | Rocheville | 30/358 |
| 2,853,723 | 9/1958 | Winslow | 29/275 X |
| 3,099,876 | 8/1963 | Lawless | 29/275 X |
| 3,176,329 | 4/1965 | Frame | 10/27 |
| 3,464,201 | 9/1969 | Ehlen | 59/7 |
| 4,234,375 | 11/1980 | Ciccarello | 30/358 X |
| 4,360,136 | 11/1982 | Bates | 225/103 |
| 4,451,959 | 6/1984 | Miller et al. | 29/156.8 R |
| 4,476,615 | 10/1984 | Cook | 29/243.54 |

FOREIGN PATENT DOCUMENTS

| | | | |
|---|---|---|---|
| 482744 | 7/1953 | Italy | 59/7 |

*Primary Examiner*—Harold J. Tudor

*Attorney, Agent, or Firm*—Donald J. Singer; Richard J. Donahue

[57] ABSTRACT

A rivet removal tool for removing semi-tubular rivets from a workpiece. The tool has a punch head whose hemispherical tip bottoms within the rivet cavity to provide alignment therewith, and a shoulder whose edge shears the enlarged end of the aligned rivet.

3 Claims, 8 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

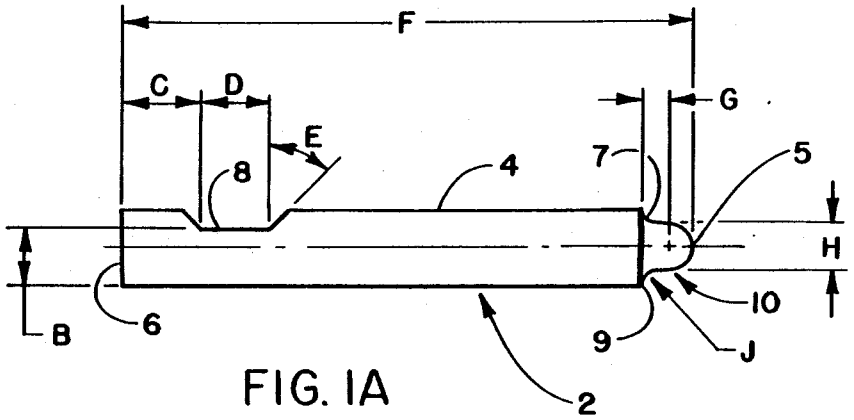
FIG. 1A
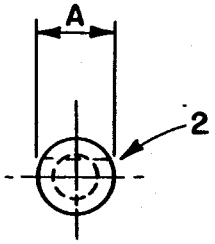
FIG. 1B
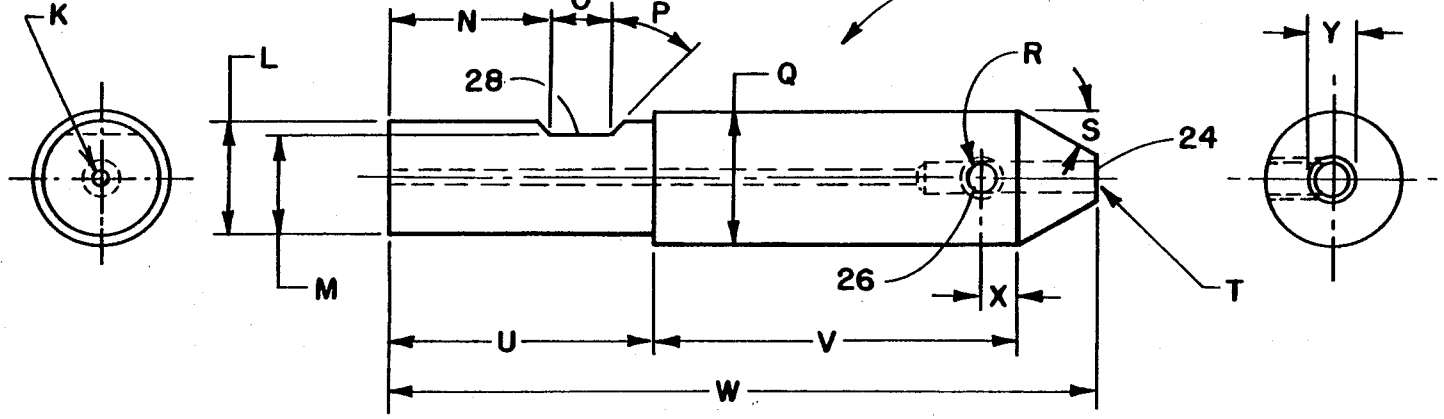
FIG. 2C
FIG. 2A
FIG. 2B

CONTOURED PUNCH TOOL FOR REMOVING SEMI-TUBULAR RIVETS

STATEMENT OF GOVERNMENT INTEREST

The invention described herein may be manufactured and used by or for the Government for governmental purposes without the payment of any royalty thereon.

This application is a division of application Ser. No. 743,326, filed June 10, 1985, now abandoned.

BACKGROUND OF THE INVENTION

This invention relates in general to a rivet removal tool or punch, and is particularly directed to a self-aligning tool for removing semi-tubular type rivets from a workpiece.

In disassembling a riveted assembly, it is highly desireable to remove the rivet or rivets with as little damage as possible to the assembly. Heretofore, this operation has been extremely time consuming and haphazard.

One known method, for example, simply employs a chisel and hammer to shear the head from the rivet. With these tools, blows on the rivet are necessarily applied to one side thereof at a time, often resulting in deformation of the rivet hole and damage to the workpiece. This method obviously cannot be used when the ends of the rivet are countersunk in the workpiece.

It is also known to utilize a conventional drill bit to remove the peened (clenched, swaged, rolled, bucked, or however enlarged, expanded or distended) end of a semi-tubular rivet, thus eliminating the above-noted disadvantage of applying lateral forces to the rivet and workpiece. This operation also requires considerable time and still presents the possibility of damaging the workpiece if, for example, the drill is not perfectly aligned with the rivet or if the operator inadvertently drills too deeply. To assure axial alignment of the rivet and drill, special part holding and indexing fixtures are often utilized.

Both of the aforementioned rivet removal methods generally require a subsequent punching operation to force the shank of the rivet out of the hole in the workpiece, which further increases the possibility of inflicting damage to the workpiece.

OBJECTS AND SUMMARY OF THE INVENTION

It is therefore a primary object of the present invention to provide a novel tool for removing semi-tubular rivets which obviates the necessity for special part holding and indexing fixtures.

Another object is to provide such a rivet removal tool having a geometry which assuredly prevents damage to the assembly held together by the rivet or rivets.

A further object is to provide a tool for removing semi-tubular rivets which is simple, rugged and economical to manufacture.

Yet another object of the invention is to provide a tool for removing rivets in which such operations can be easily accomplished in an extremely short period of time.

Still another object of the invention is to provide a rivet removal tool having a holder for facilitating its use in a hydraulic press.

These and other objects of the invention are attained by providing a tool having a hemispherically contoured punch head which enters and engages the conically-shaped bottom surface of the rivet cavity assuring (and if necessary forcing) an axial alignment therebetween. After the tool bottoms in the rivet cavity, a projecting shoulder on the tool has an edge which contacts and shears through the clenched end of the rivet and the rivet is then urged out of the workpiece by the continued downward motion of the tool.

With the above and other objects in view, the nature of the invention will be more clearly understood by reference to the following detailed description, the appended claims and the several views illustrated in the accompanying drawings.

BRIEF DESCRIPTION OF THE DRAWINGS

FIGS. 1A and 1B are side and top end plan views respectively of the rivet removal tool of the present invention;

FIGS. 2A, 2B and 2C are side, top end and bottom end plan views respectively of a holder for the rivet removal tool of the present invention.

DETAILED DESCRIPTION OF THE INVENTION

Figure 3A:
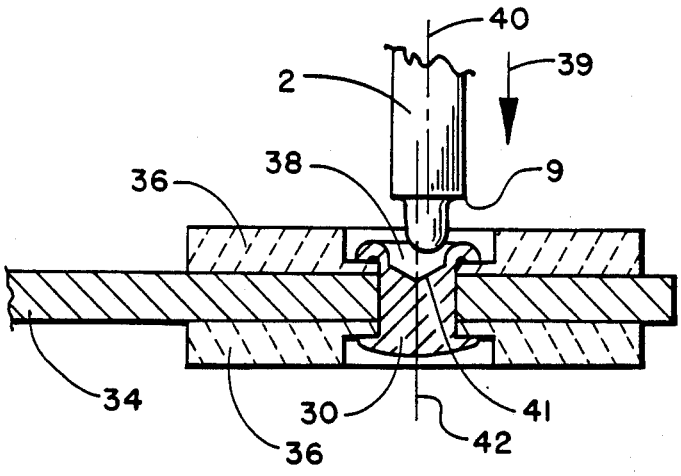
FIGS. 3A, 3B and 3C are partially cross-sectioned fragmentary views showing the relative positions of the punch head end of the rivet removal tool and a rivet disposed in an aircraft brake pad assembly workpiece during successive stages of removing the rivet from the workpiece.

Referring now to the drawings, and in particular to FIGS. 1A and 1B thereof, there is illustrated the side and top end plan views respectively of the rivet removal tool 2 of the present invention. Tool 2 is comprised of a generally cylindrical shank 4 having a top end 6 which is adapted to be slideably inserted and secured within a tool holder. The shank 4 of tool 2 has a flat 8 formed thereon which provides a seat for a set screw adapted to retain tool 2 in the tool holder. A preferred embodiment of the tool holder is shown in FIGS. 2A–2C of the drawings and is described in detail below.

The punch head end 10 of tool 2 will be seen to be abruptly reduced in diameter with respect to the shank 4 and has a substantially hemispherically-contoured nose or tip 5. This abrupt reduction in diameter of the punch head 10 with respect to the shank 4 forms a shoulder 7 having an edge 9. The relevance of the specific contour of the tip 5 of the punch head 10, as well as the provision of the shoulder 7 and edge 9, will become evident as this description proceeds.

FIGS. 2A, 2B and 2C are plan views of a holder 20 for the rivet removal tool 2. Tool 2 is inserted in the hole 24 formed in holder 20 and is retained therein by a set screw located in threaded hole 26. The set screw contacts the flat 8 formed on tool 2.

A similar flat surface 28 is formed in tool holder 20 for facilitating the retention of tool holder 20 in a conventional punch press ram. The girth of tool holder 20 provides lateral support along a considerable portion of the shank 4 of tool 2. Tool holder 20 will accommodate a family of such tools having differing punch head dimensions, thereby simplifying and reducing the cost of the individual tools required for different sized rivets.

Figure 3B:
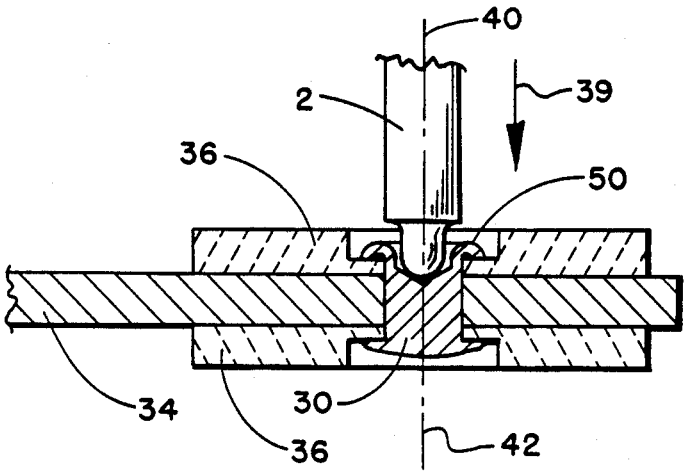
Figure 3C:
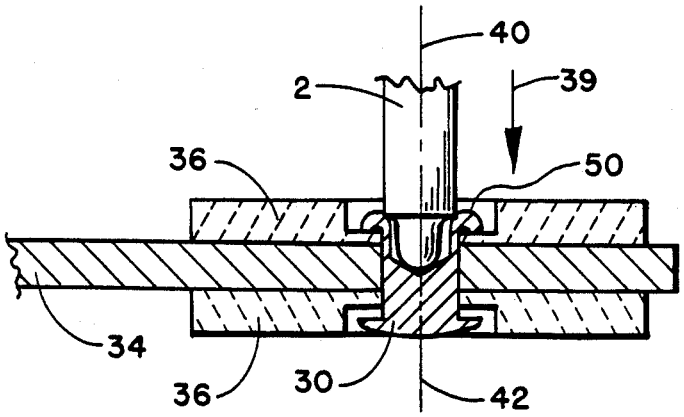

FIGS. 3A, 3B and 3C illustrate progressive operative positions of the rivet removal tool in the removal of a semi-tubular rivet 30 from an aircraft brake pad assembly having a stator 34 and two brake pads 36. The rivet 30 is of the semi-tubular type having a cylindrical cavity 38 formed part way through its shank. The bottom surface 41 of the cavity will be seen to have a substantially conical shape.

In FIG. 3A, the tool 2 is shown entering the rivet cavity 38 in the direction indicated by arrow 39. The tool axis 40 is slightly misaligned at this stage with the centerline 42 of rivet 30.

As seen in FIG. 3B the hemispherical contour of the nose 5 of the tool 2, however, is such as to bring the tool axis 40 and rivet axis 42 into alignment as the nose of the tool 2 engages the conical bottom surface 41 of the rivet cavity 38.

It is important to note that a small space exists between the hemispherical tip 5 of tool 2 and the apex of the bottom surface 41 in rivet 30. This assures that slight surface imperfections or foreign matter at the apex will not adversely influence the self alignment feature of this invention.

In FIG. 3C, the initial movement of the rivet 30 allows the square edge 9 of the tool 2 to contact and shear through the distended portion 50 of rivet 30 which is subsequently removed from the brake pad assembly upon further movement of the tool 2 in the direction indicated by arrow 39.

A rivet removal tool and tool holder have been constructed in accordance with the embodiments thereof disclosed herein to remove semi-tubular rivets from a specific brake pad assembly. The rivets were formed of stainless steel material, had an outer diameter of 0.250±0.005 inches, an inner diameter of 0.175±0.005 inches, and had a cavity therein of 0.125 inches to the depth of the full inner diameter. The actual values and tolerances for the tool and tool holder dimensions (given letter designations in the drawings) were as follows:

| DIMENSION | VALUE | |
|---|---|---|
| A | .230 +.000 −.002 | inches |
| B | .180 ±.005 | inches |
| C | .25 ±.010 | inches |
| D | .25 ±.010 | inches |
| E | 45 ±1 | degrees |
| F | 1.75 ±.005 | inches |
| G | .080 ±.002 | inches |
| H | .155 ±.001 | inches |
| J | .03 radius | inches |
| K | .094 +.002 −.001 | inches |
| L | .750 ±.002 | inches |
| M | .68 ±.015 | inches |
| N | 1.12 ±.015 | inches |
| O | .38 ±.015 | inches |
| P | 45 ±2 | degrees |
| Q | .88 ±.015 | inches |
| R | .188 +.002 −.001 (tap ¼-20) | inches |
| S | 30 ±2 | degrees |
| T | .232 ±.001 (1.125 in. depth) | |
| U | 1.75 ±.015 | inches |
| V | 2.38 ±.015 | inches |
| W | 4.62 ±.015 | inches |
| X | .25 ±.015 | inches |
| Y | .303 ±.002 | inches |

While the present invention has been described in connection with a rather specific embodiment thereof, it will be understood that many modifications and variations will be readily apparent to those of ordinary skill in the art and that this application is intended to cover any adaptation or variation thereof. Therefore, it is manifestly intended that this invention be only limited by the claims and the equivalents thereof.

What is claimed is:

1. A combined tool and tool holder for removing a semi-tubular rivet from a workpiece;

said tool comprising:

a solid metal shank of generally cylindrical shape having a first end adapted to be affixed in said tool holder and a second end having a punch head integrally extending therefrom;

said shank having a diameter adjacent said punch head substantially equal to but not exceeding the outer diameter of a rivet to be removed by said tool;

said punch head being of a cylindrical shape coaxial with said shank, and having a diameter smaller than the inner diameter of said rivet;

said tool having a shoulder with a shearing edge formed at the juncture of said shank and said punch head;

said punch head having a hemispherical surface at the tip thereof, and having a length sufficient to engage the bottom of the cavity in said semi-tubular rivet prior to the engaging of said shearing edge of said tool with said rivet said tool holder comprising:

a metallic cylinder of generally cylindrical shape having a first end and a second end;

said first end of said tool holder having a flattened area on the surface thereof for retaining said tool holder in a punch press ram;

said second end of said tool holder being chamfered, having a cavity in the longitudinal axis thereof to accept said first end of said tool, and having a set screw therein for retaining said tool in said cavity.

2. A method for removing a rivet from a workpiece, said rivet being of the type having a tubular end defining a cylindrical cavity extending part way through the body thereof, the wall of said tubular end being expanded where it protrudes from the surface of said workpiece to clamp parts of said workpiece, said method using a tool having a punch head being of cylindrical shape and having a hemispherical tip, said punch head having an axial length at least equal to the depth of said cavity, said tool having a cylindrical shank coaxial with said punch head and of a larger diameter than said punch head forming a shoulder with a shearing edge, said method comprising the steps of:

inserting said punch head of said tool into said cavity with sufficient initial force to cause said punch head to bottom in said cavity and bring said rivet and said tool into axial alignment;

applying a sufficient intermediate axial force to said tool to cause said shearing edge to contact and shear the expanded wall of said tubular end of said rivet; and applying a sufficient final axial force to said tool to cause said body of said rivet to be ejected from said workpiece.

3. An assembly comprising:

workpiece means having bore means of substantially uniform diameter;

a rivet of the type having a preformed head, a generally cylindrical body and tubular end extending only part way through said body of said rivet to form a cylindrical cavity having a conically-shaped bottom surface in said rivet;

said rivet being positioned within said bore means and having said tubular end thereof expanded where it protrudes above said bore means of said workpiece to retain said rivet in said workpiece; and a tool for removing said rivet from said workpiece comprising:

a solid metal shank of generally cylindrical shape having a first end adapted to be affixed in a tool holder and a second end having a punch head integrally extending therefrom and engaging said tubular end of said rivet;

said shank having a diameter adjacent said punch head substantially equal to but not exceeding the outer diameter of said rivet to be removed by said tool;

said punch head being of cylindrical shape coaxial with said shank, and having a diameter smaller than the inner diameter of said rivet;

said tool having a shoulder with a shearing edge formed at the juncture of said shank and said punch head;

said punch head having a hemispherical surface at the tip thereof which engages said conically-shaped bottom surface of said cavity in said rivet prior to the engaging of said shearing edge of said tool with said rivet.

* * * * *